June 10, 1958 S. T. DEAKIN 2,837,772
COATING OF PLASTIC MATERIAL
Filed Aug. 13, 1954 2 Sheets-Sheet 1
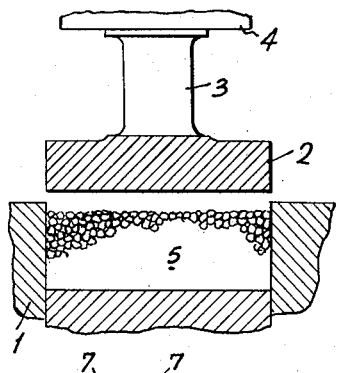
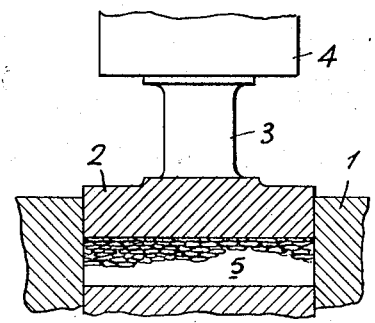
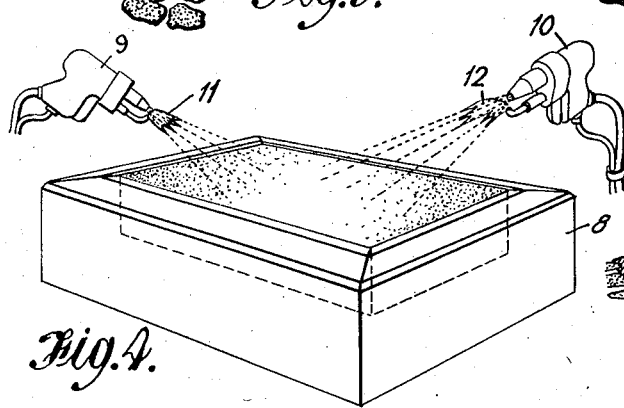
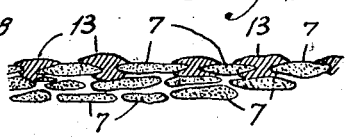
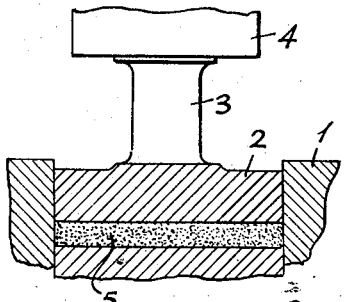
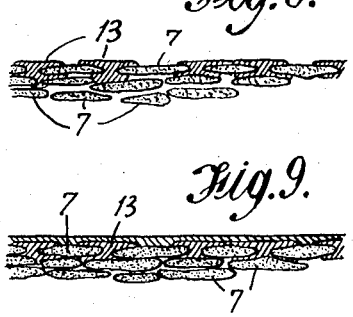
INVENTOR
Stanley T. Deakin
By Norris & Bateman
ATTORNEYS June 10, 1958  S. T. DEAKIN  2,837,772
COATING OF PLASTIC MATERIAL
Filed Aug. 13, 1954  2 Sheets-Sheet 2
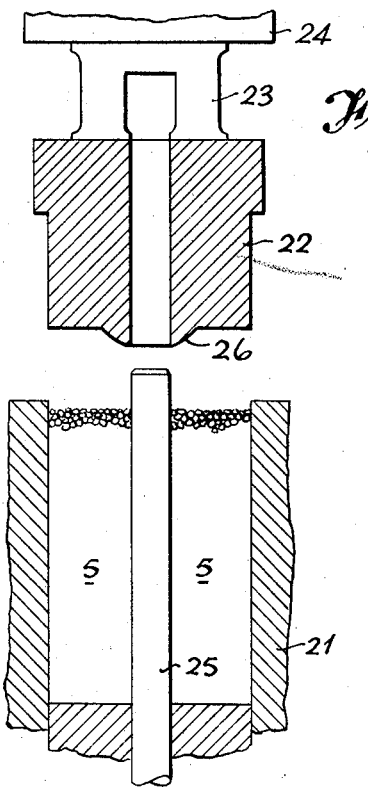
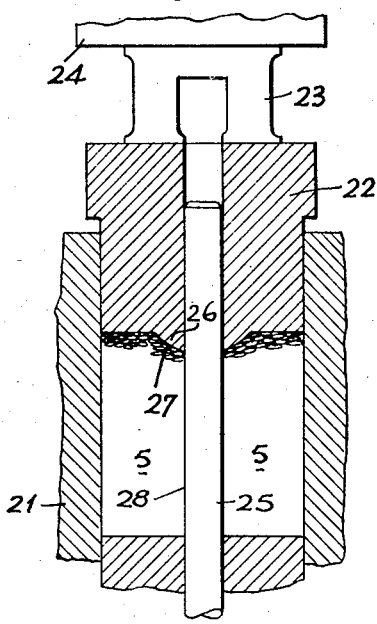
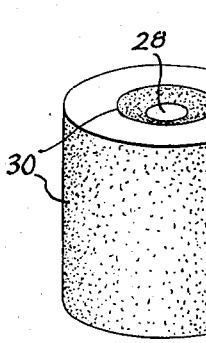
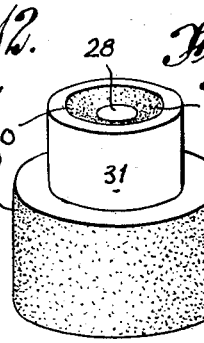
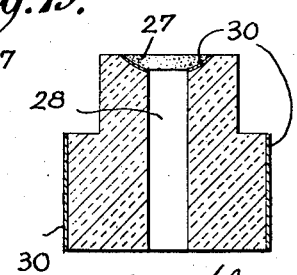
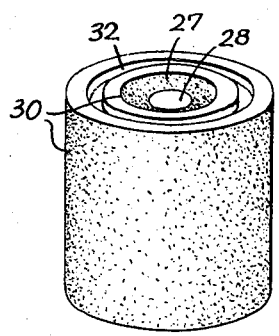
INVENTOR
Stanley T. Deakin
By Norris, Bateman
ATTORNEYS

# United States Patent Office 2,837,772
Patented June 10, 1958

2,837,772

COATING OF PLASTIC MATERIAL

Stanley Thomas Deakin, Ewell West, England, assignor, by mesne assignments, to Siemens Edison Swan Limited, Westminster, London, England, a British company Application August 13, 1954, Serial No. 449,801

Claims priority, application Great Britain August 25, 1953

3 Claims. (Cl. 18—59)

This invention relates to the coating of polytetrafluoroethylene, referred to herein as P. T. F. E., with a metallic coating. Hitherto difficulty has been experienced in coating certain plastics, particularly P. T. F. E., with a metallic coating which will adhere well to the plastic.

According to the present invention a process of coating P. T. F. E. with metal consists in initially compressing the P. T. F. E. in granular or like state to form a porous block, sheet or other shape, covering the required portions of the surface of the P. T. F. E. with a metallic coating in such a manner as to cause metal to fill the spaces between the P. T. F E. particles, further compressing the coated P. T. F. E. so as to mould it more closely to the required dimensions, thus increasing the bonding action between the P. T. F. E. and the metal, and finally heat-treating the P. T. F. E. to effect its setting.

The heat treatment of P. T. F. E. consists in heating the block to a temperature between 320° and 400° C. (preferably 327° C.) and then allowing the block to cool under pressure in the mould.

It will be appreciated that the initial cold compression of the P. T. F. E. particles will cause them to be sufficiently compacted for the block so formed to be handled and to retain its shape during the metallising stage. The block must be greater along at least one dimension so as to allow for further compression after the surface has been metallised.

The metal employed for the coating should preferably have a melting point higher than the maximum temperature employed in heat treating the P. T. F. E. and may, for example, be copper or brass.

The metallic coating formed by the process of the invention may serve as a base for further coatings of the same or similar metals, which may be applied, for instance, by soldering or electroplating, provided that the temperature reached in such operations does not reach that which, if applied to the P. T. F. E., would cause fusing or permanent deformation thereof.

In order that the process of the invention may be more easily understood, reference will now be made to the accompanying drawings, in which:

Figs. 1, 2 and 3 are diagrams of one form of apparatus used to compress the P. T. F. E. into rectangular blocks, and indicate three stages in the compression;

Fig. 4 is a diagram of apparatus for applying a metal coating to the surface on a preformed block of P. T. F. E.;

Figs. 5, 6, 7, 8 and 9 are diagrammatic views of the microscopic structure of the P. T. F. E. at various stages of the process;

Figs. 10 and 11 are diagrams of a second form of apparatus used to compress the P. T. F. E. into a cylindrical block and indicate two stages of the compression;

Fig. 12 is a view of a cylindrical block formed by the apparatus described with reference to Figs. 10 and 11, Figs. 13 and 14 are two views of the cylindrical block described with reference to Fig. 12 which has been further processed, and Fig. 15 is a view of an alternative way of processing a cylindrical block.

With reference to Figs. 1, 2 and 3, there is shown a mould 1 with a closing portion 2 operated by a rod 3 from a mechanism 4. The granulated P. T. F. E. 5 is inserted in the mould and compressed as indicated.

The P. T. F. E., after insertion in the mould, is compressed as indicated in Fig. 2 and its volume reduced by about half. The microscopic structure of the P. T. F. E. at the beginning and the end of its initial compression is as indicated in Figs. 5 and 6. Fig. 5 shows how the particles of P. T. F. E. 7 are initially widely spaced apart and are of irregular shape. Fig. 6 shows how the initial compression partially compacts the particles, partially flattens them, and forms a coherent block of P. T. F. E. capable of being handled.

The P. T. F. E. block is removed from the mould and placed in a frame 8, as indicated in Fig. 4, with one required surface exposed. Metal powder from suitable spray guns 9 and 10 is blown by air pressure through flames 11 and 12 which are hot enough to melt the metal. The liquid metal passes on to the surface of the P. T. F. E. from all directions as the spray guns 9 and 10 are suitably moved about. The metal penetrates the surface of the porous P. T. F. E. and fills up the spaces between the particles of the P. T. F. E. on the block. This is indicated in Fig. 7, which shows the metal 13 penetrating the compacted P. T. F. E. particles 7. The layer of metal is thin but adheres to the surface because it is locked between the P. T. F. E. particles.

In the next stage of the process the P. T. F. E. block with metal coating is reinserted in the mould and further cold-pressed as shown in Fig. 3. The volume of the P. T. F. E. is reduced to a value which is approximately one-third of the original volume. This second compression causes the metal to be bound more tightly between the P. T. F. E. particles as is shown in Fig. 8, and the metal coating is thereby caused to adhere more strongly to the P. T. F. E.

A second layer of the metal 14, or a layer of a different metal, may then be deposited on top of the first layer by soldering or any other known process, thereby enabling a thick metallic coating to be applied to the P. T. F. E. which adheres strongly thereto, as shown in Fig. 9.

The first metallic coating may be applied to any surface of the P. T. F. E. block, and the metal is held between the particles of P. T. F. E. in the manner described above. If the mould has rough sides the adherence of the metal to the P. T. F. E. is improved, and a rough surface to the first metallic layer would also improve adherence of the second layer of metal.

Figs. 10 and 11 are diagrams of a second form of apparatus which can be used in the construction of cylindrical bushings of P. T. F. E. An annular mould 21 is closed by a cylindrical portion 22 which is operated by shafts 23 from a mechanism 24. The granulated P. T. F. E. 5 is inserted in the mould and cold compressed as before. The central spigot 25 in the mould causes the resultant cylindrical block to have a central hole 28. The dimensions of the mould can be chosen as required. A circular boss 26 on the closing portion 22 causes a recess 27 to be formed in the top of the block.

After the initial compression of the P. T. F. E. to form a partially compacted block capable of being handled as previously described, the block is removed from the mould and a thin layer of metal applied to the required surface by the previously described method.

Fig. 12 shows how the metal can be applied to the outer surface and the recess 27 to form a block into an insulating bushing. Reference 30 indicates the metal coating.

Fig. 13 shows how a portion of the block is removed leaving the metallised surface 30 and the unmetallised surface 31.

Fig. 14 is a section through the finished bushing. An electric cable may be inserted through the hole 28 and soldered in the recess 27 to retain the cable in the hole. The outer surface of the bushing can be soldered to a suitable supoprt, thereby providing an insulated support for the cable.

Fig. 15 shows an alternative design of insulating bushing formed using the same mould. The metal coating 30 extends over the whole of the curved surface of the bushing as well as in the recess 27, and one or more annular grooves 32 are cut in the end face so as to provide a longer insulating surface path between the outer conducting surface and the inner recessed conducting surface.

As an alternative, the metallising of the requiring surfaces of the initially compressed P. T. F. E. block may be effected by a sputtering process, or the metal may be deposited by vaporising, or in any other known manner.

After applying the first metallic layer it may be necessary to clean the metal before applying a further metal layer, and such cleaning may be effected either by a chemical process, e. g. by the use of acids, or by a mechanical process, e. g. by wire brushing, scraping, burnishing or the like.

In some cases, such as in the manufacture of bushings, grooves, holes or other recesses may be formed either in the end faces or round the sides by inserting a vaporisable or fusible substance, e. g. nitrocellulose or collodion, which substance evaporates or flows during the heating process.

In metallising an internal surface such as the surface of a bore extending through a bushing, the meal may be carried on the surface of a metal plug which is inserted in the bore and subsequently removed.

What I claim as new and desire to secure by Letters Patent of the United States is:

1. A process of coating polytetrafluoroethylene with a metal consisting in initially cold compressing the polytetrafluoroethylene in granular form into a shape, surfacing said shape with a metallic coating so as to cause the metal to flow into the spaces between the polytetrafluoroethylene granules, further cold compressing the coated polytetrafluoroethylene so as to mould it more closely to a required shape, thus increasing the bonding action between the polytetrafluoroethylene and the metal and finally heat treating said coated polytetrafluoroethylene to a temperature between 320 and 400° C. to effect its setting.

2. A process of coating polytetrafluoroethylene with a metal of the class comprising copper and brass consisting in initially cold compressing the polytetrafluoroethylene in powder form into a shape, surfacing said shape with a coating of said metal by blowing particles of said metal onto said shape through a flame of sufficient heat to melt said particles, further cold compressing the coated polytetrafluoroethylene so as to mould it more closely to the required shape and finally heat treating said coated polytetrafluoroethylene to a temperature of between 320 to 400° C. to effect its setting.

3. A process of manufacturing a cylindrical insulated bushing of polytetrafluoroethylene comprising initially cold forming powdered polytetrafluoroethylene in an annular press, forcing a hollow cylindrical ram axially into the annular chamber so as to cold compress the powdered polytetrafluoroethylene, removing the formed bushing from said press and metallising the outer surface of said bushing, further cold compressing said bushing in said press and finally heat treating said bushing to a temperature of 320–400° C. to cause it to set.

References Cited in the file of this patent

UNITED STATES PATENTS

| | | |
|---|---|---|
| 1,987,969 | Parkin | Jan. 15, 1935 |
| 2,456,262 | Fields | Dec. 14, 1948 |
| 2,602,962 | Deakin | July 15, 1952 |
| 2,689,380 | Tait | Sept. 21, 1954 |
| 2,728,698 | Rudner | Dec. 27, 1955 |
| 2,745,141 | Brennan | May 15, 1956 |